United States Patent Office.

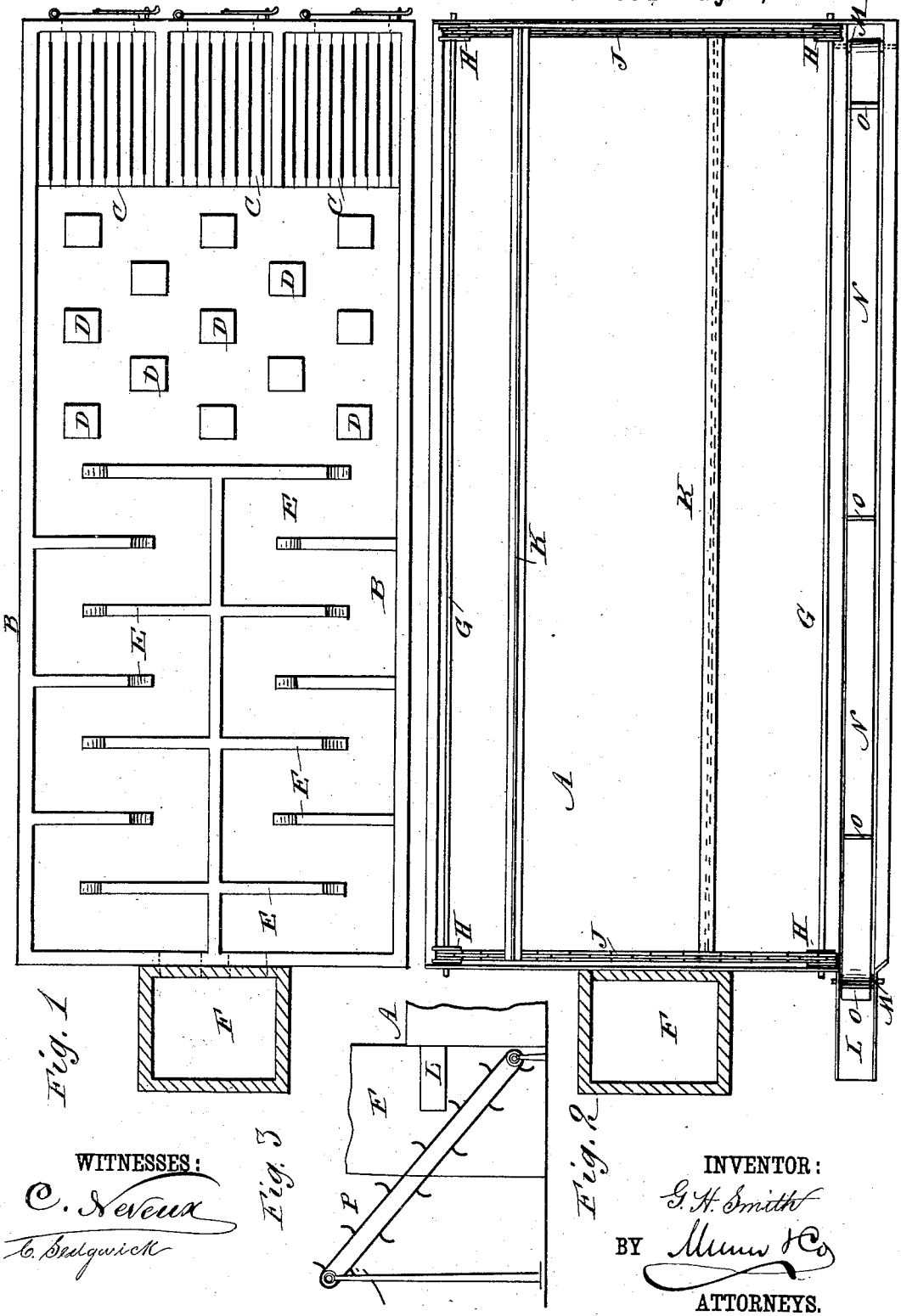

GEORGE H. SMITH, OF HAVERSTRAW, NEW YORK.

SALT-EVAPORATING PAN.

SPECIFICATION forming part of Letters Patent No. 317,229, dated May 5, 1885.

Application filed October 7, 1882. Renewed February 19, 1885. (No model.)

*To all whom it may concern:*

Be it known that I, GEORGE H. SMITH, of Haverstraw, in the county of Rockland and State of New York, have invented certain new and useful Improvements in Salt-Evaporating Pans, of which the following is a full, clear, and exact description.

The object of my invention is to provide a new and improved evaporating-pan to facilitate the separation of salt from the brine.

The invention consists in an evaporating-pan having a trough at one longitudinal edge, which pan and trough are provided with endless belts or chains on which are mounted hoes or scrapers which scrape the salt from the pan into the trough, and then to the end of the trough, from which the salt drops upon an inclined elevator, which carries it upward and permits the water to drop off.

The invention also consists in a furnace provided with a series of fire-places and piers and transverse partitions to cause a thorough circulation of heat under the evaporating-pan.

Reference is to be had to the accompanying drawings, forming part of this specification, in which similar letters of reference indicate corresponding parts in all the figures.

Figure 1 is a plan view of the furnace upon which the pan rests, the pan being removed. Fig. 2 is a plan view of the pan. Fig. 3 is a side elevation of one end part of the same.

The evaporating-pan A rests upon the furnace B, which is provided with a series of fire-places, C, and piers D, and longitudinal and transverse partitions E, to cause a thorough circulation of the heat and products of combustion under the pan A before they pass off through the smoke-stack F. The free ends of the transverse partitions E are beveled, so that the widths of the openings at the ends of the said partitions increase from the bottom upward, causing the heat to circulate in the upper part of the furnace directly below the pan, where there is least obstruction to the heat. A shaft, G, is journaled in the pan A at each longitudinal edge, and on each shaft G a sprocket-roller, H, is mounted at each end, over which rollers endless chains J pass, to which chains one or more longitudinal hoes or scrapers, K, are attached, which can scrape the salt in the pan toward one of the longitudinal edges of the said pan. At the said edge the pan is provided with a trough or gutter, L, in the ends of which sprocket-rollers M are journaled, over which chains or a belt, N, run, to which a series of hoes, scrapers, or buckets, O, are attached. The trough or gutter L projects beyond the end of the pan, as shown in Fig. 3, and from the end of the said trough the salt drops upon an inclined elevator, P, from the upper end of which it drops into a chute or car. As the elevator is inclined, the water in the brine drips off very rapidly, and the salt will be quite dry when it reaches the top of the elevator.

The operation is as follows: One of the shafts G is rotated by some suitable motor in such a manner that the lower strands of the chains move along the bottom of the pan toward the gutter L at the longitudinal side of the pan. The hoes K, which always remain parallel with the sides of the pan, are thus successively carried across the pan and scrape the salt into the gutter or trough L, in which it is carried to one end by the hoes O in the said gutter. It then drops upon the elevator P and is conducted to a chute or car.

The chains J may be provided with more or less hoes K, as the circumstances may require. Likewise the belt or chain N in the trough L can be provided with more or less hoes.

The conveyer N O may be operated by any suitable power-connections to either or both of the sprocket-rollers M, as most convenient or desirable.

Having thus fully described my invention, I claim as new and desire to secure by Letters Patent—

1. A rectangular evaporating-pan having a trough depressed below the general level of the pan-bottom, and carriers provided with hoes operating in the body of the pan to scrape the salt into the trough, substantially as described.

2. In combination with a rectangular pan having a depressed trough in its bottom, a series of hoes in the body of the pan operating to scrape the salt into the trough, and a conveyer in the trough to remove the salt therefrom, substantially as described.

3. The combination, with a rectangular evaporating-pan having a depressed trough in its bottom, of endless-chain carriers provided with hoes operating in the shallow part of the pan to scrape the salt into the trough and an endless conveyer moving at right angles to to the path of movement of said hoes to remove the salt from the trough, all substantially as described.

4. The combination, with an evaporating-pan, of the furnace B, provided with a series of fire-places, C, piers D, and transverse partitions E, substantially as herein shown and described, and for the purpose set forth.

GEO. H. SMITH.

Witnesses:
J. M. HEDGES,
WM. H. CARR.